United States Patent
Chen et al.

(10) Patent No.: US 9,213,344 B2
(45) Date of Patent: Dec. 15, 2015

(54) RIPPLE SUPPRESSOR CIRCUIT AND METHOD THEREFOR

(71) Applicants: Gang Chen, Taipo (HK); Chunbo Liu, San Jose, CA (US); Gabor Reizik, Dublin, CA (US)

(72) Inventors: Gang Chen, Taipo (HK); Chunbo Liu, San Jose, CA (US); Gabor Reizik, Dublin, CA (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 268 days.

(21) Appl. No.: 13/937,943

(22) Filed: Jul. 9, 2013

(65) Prior Publication Data

US 2014/0049232 A1 Feb. 20, 2014

Related U.S. Application Data

(60) Provisional application No. 61/691,161, filed on Aug. 20, 2012.

(51) Int. Cl.

| G05F 1/10 | (2006.01) |
|---|---|
| H02M 1/14 | (2006.01) |
| H02M 1/15 | (2006.01) |
| H02M 3/156 | (2006.01) |
| H02M 3/139 | (2006.01) |
| H02M 3/157 | (2006.01) |

(52) U.S. Cl.
CPC ............. *G05F 1/10* (2013.01); *H02M 1/143* (2013.01); *H02M 1/15* (2013.01); *H02M 3/156* (2013.01); *H02M 3/139* (2013.01); *H02M 3/157* (2013.01)

(58) Field of Classification Search
CPC ......... H02M 1/14; H02M 1/143; H02M 1/15; H02M 3/137; H02M 3/139; H02M 3/156; H02M 3/157
USPC .......................... 323/282–283, 288, 312–313
See application file for complete search history.

(56) References Cited

U.S. PATENT DOCUMENTS

| 6,020,729 A * | 2/2000 | Stratakos | H02M 3/156 323/283 |
|---|---|---|---|
| 7,313,034 B2 * | 12/2007 | Joo | G11C 5/147 327/355 |
| 8,531,166 B2 * | 9/2013 | Fang | H02M 3/156 323/222 |
| 2009/0051656 A1 * | 2/2009 | Saito | H03K 17/962 345/168 |

* cited by examiner

*Primary Examiner* — Jeffrey Gblende
(74) *Attorney, Agent, or Firm* — Robert F. Hightower

(57) ABSTRACT

In one embodiment, a method of forming a ripple suppressor circuit includes a configuring the ripple suppressor circuit to receive a first signal that is representative of a requested voltage and a second signal that is a filtered value of the first signal. The method also includes configuring the ripple suppressor circuit to determine a peak value of the second signal responsively to the first signal and to determine a minimum value of the second signal responsively to the first signal. The method may also include configuring the ripple suppressor circuit to form an average value of the peak value and the minimum value.

20 Claims, 2 Drawing Sheets

RIPPLE SUPPRESSOR CIRCUIT AND METHOD THEREFOR

PRIORITY CLAIM TO PRIOR PROVISIONAL FILING

This application claims priority to prior filed Provisional Application No. 61/691,161 entitled "System and Method for Ripple Reduction in Power Converters" filed on Aug. 20, 2012, and having common inventors Gabor Reizik et al.

BACKGROUND OF THE INVENTION

The present invention relates, in general, to electronics, and more particularly, to semiconductors, structures thereof, and methods of forming semiconductor devices.

In the past, the electronics industry utilized various methods and structures to form power supply controllers. Some power supply controllers operated with signals that requested the power supply controller change a value of an output voltage in response to a value of a control signal. However, the control signal could have variations that resulted in the output voltage having a value that varied such as having a ripple voltage around the desired value of the output voltage. This ripple voltage was undesirable.

The variations in the value of the control signal also could result in timing variations in a timing signal formed by the power supply controller. The timing signal variations could be referred to as the timing signal having a beat frequency. These beat frequencies were also undesirable.

Accordingly, it is desirable to have a method and apparatus that reduces ripple in the output voltage and/or that reduces beat frequencies.

Figure 1:
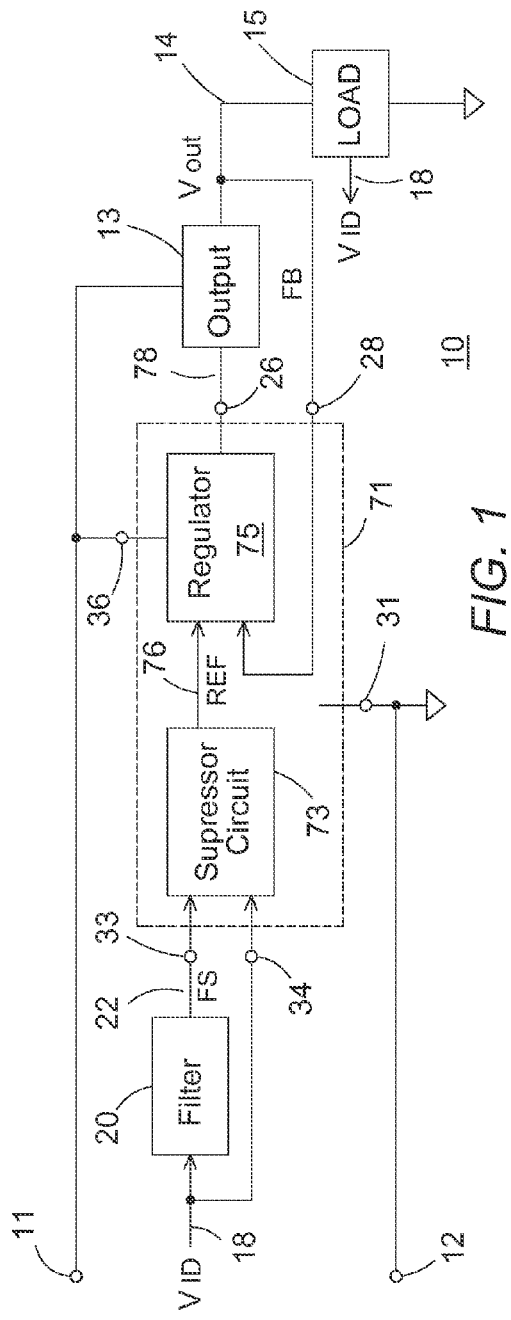
FIG. 1 schematically illustrates an example of an embodiment of a portion of a power supply system includes a ripple suppressor circuit in accordance with the present invention.

For simplicity and clarity of the illustration(s) elements in the figures are not necessarily to scale, some of the elements may be exaggerated for illustrative purposes, and the same reference numbers in different figures denote the same elements, unless stated otherwise. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, and that conductivity type does not refer to the doping concentration but the doping type, such as P-type or N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten percent (10%) (and up to twenty percent (20%) for semiconductor doping concentrations) are reasonable variances from the ideal goal of exactly as described. When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

DETAILED DESCRIPTION OF THE DRAWINGS

FIG. 1 schematically illustrates an example of an embodiment of a portion of a power supply system 10 that is configured to form an output voltage (Vout) to supply to a load 15. System 10 typically receives an input voltage between a voltage input 11 and a common return terminal 12 and utilizes the input voltage to form output voltage (Vout) on an output 14 of system 10. The input voltage may be a rectified version of an ac voltage or other type of voltage. A power supply controller 71 of system 10 typically is configured to receive a feedback signal (FB) that is representative of the value of Vout and regulate Vout to some desired value. Those skilled in the art will appreciate that controller 71 may receive a variety of other signals instead of or in addition to the FB signal such as a current sense signal and other sense signals that assist controller 71 to control the value of Vout. Controller 71 generally is configured to form a control signal 78 that is used to control output elements 13 in order to regulate the value of Vout. In one embodiment, controller 71 may be a switching power supply controller, such as a pulse width modulated (PWM) controller or a pulse frequency modulator (PFM), or other type of switching power supply controllers. For such embodiments, output elements 13 may include inductors or transformers or power switches configured in a synchronous rectifier configuration or other well-known configurations that implement power supply systems such as in buck or boost configurations or combinations thereof. In another embodiment, portions of elements 13, such as power switches, etc., may be included within controller 71. In another embodiment, controller 71 may be a linear voltage regulator such as a low dropout (LDO) or other type of linear regulator that linearly varies the value of control signal 78. Controller 71 typically includes a voltage regulator section or regulator 75 that receives the feedback signal and forms control signal 78.

An embodiment includes configuring system 10 to supply the output voltage (Vout) to a microprocessor or other type of control logic that is configured to request that controller 71 form the value of Vout at certain requested values, or to request controller 71 to increase or decrease Vout such as relative to a present value of Vout. For example, load 15 may be a video processor that processes information to display graphics. The processor may increase an operating frequency of the processor in order to more rapidly execute algorithms and therefore may request that controller 71 increase the value of Vout. For example, load 15 or some other system component may supply a voltage identification control (VID) signal 18 as a digital signal that has a duty cycle that is representative of a desired value of Vout or of the requested value of Vout. An embodiment may include that signal 18 is formed as a pulse width modulated (PWM) signal having a duty cycle that is representative of the requested value of Vout. An example embodiment of signal 18 has a fixed period but a duty cycle that may vary.

System 10 typically includes a filter network or filter 20 that receives signal 18 and filters signal 18 to form a filtered signal (FS) 22 that has a filtered value of signal 18. Because signal 18 is a digital signal that changes between a first state and a second state, the value of signal 22 typically varies around some nominal voltage. For example, the variations of signal 22 may include variations as a result of the state changes of signal 18. In one non-limiting example, the operating frequency of signal 18 may be in the range of approximately one hundred kilo-hertz to three mega-hertz (100 KHz-3 MHz). Typically, the frequency is substantially constant. One example of filter 20 may have a time constant that is approximately five to fifty micro-seconds (5-50 μsec.). In another embodiment, signal 22 is a signal having a value that varies in value in response to changes in signal 18.

Figure 3:
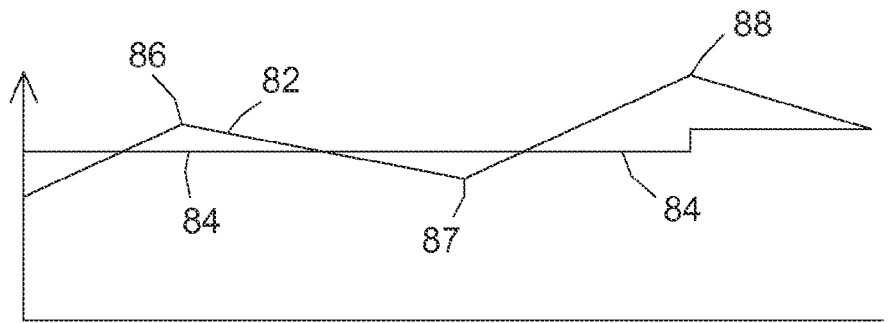
FIG. 3 as a graph having plots that illustrate values of some of the signals formed by the ripple suppressor circuits of FIGS. 1 and 2 in accordance with the present invention.
Figure 3:
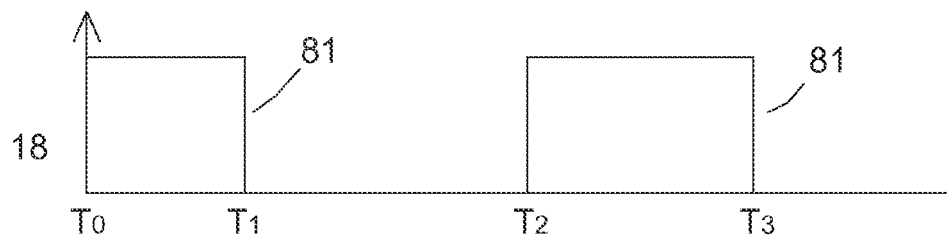

FIG. 3 is a graph having plots that illustrate values of some of the signals formed by system 10. The abscissa indicates time and the ordinate indicates increasing value of the illustrated signal. A plot 81 illustrates examples of signal 18 and a plot 82 illustrates examples of signal 22. A plot 84 illustrates a reference (REF) signal 76. This description has references to FIG. 1 and FIG. 3. Because signal 18 is a digital signal and is representative of a requested value of Vout, the design of filter 20 typically allows the changes of the digital signal to affect the value of signal 22. Thus, the value of signal 22 or filtered value typically varies in response to changes of signal 18. As illustrated by plots 81 and 82, signal 22 typically varies and has peak values, such as illustrated by peak values 86 and 88, and has valley or minimum values as illustrated by a minimum value 87. Thus, signal 22 generally is not a pure dc value. An embodiment of signal 22 includes signal 22 being an analog signal.

In some other systems, other power supply controllers used the value of signal 22 to adjust the control signal and attempt to control the value of the output voltage to be the requested value according to signal 18. However, because the value of signal 22 was not a dc value but varied, the variations of signal 22 resulted in a ripple voltage or corresponding variations in the value of Vout instead of Vout being a well regulated value.

Controller 71 includes a ripple suppressor circuit or suppressor circuit 73 that is configured to minimize or is suppress the variations of signal 22 and improve the stability of Vout.

An embodiment may include configuring a first input of circuit 73 to receive a first signal that is a digital signal having a duty cycle that is representative of a desired value. For example, an input 34 may receive signal 18; configuring a second input of circuit 73 to receive a second signal that is an analog signal having a value that varies responsively to changes of the first signal. For example, input 33 may receive signal 22; configuring circuit 73 to determine a peak value of the second signal responsively to a first state change of the first signal and to determine a minimum value of the second signal responsively to a second state change of the first signal; and configuring circuit 73 to form an average value of the peak value and the minimum value.

An embodiment may include forming a first input of circuit 73 to receive a first signal that is a pulse width modulated signal having a duty cycle that is representative of a requested Vout value; forming a second input of circuit 73 to receive a second signal that is a filtered value of the first signal; forming circuit 73 to form a third signal that is a peak value of the second signal; configuring circuit 73 to form a fourth signal that is a valley value of the second signal; and configuring circuit 73 to form an output signal that is an average value of the third and fourth signals.

An embodiment may include configuring circuit 73 to store the peak value of signal 22 on a first storage element responsively to the first state change. Another embodiment may include configuring circuit 73 to store the first value on the first storage element at the first transition. An embodiment may include configuring circuit 73 to store the valley value of signal 22 on a second storage element, responsively to the second state change. Another embodiment may include configuring circuit 73 to store the second value on the second storage element at the second transition.

Figure 2:
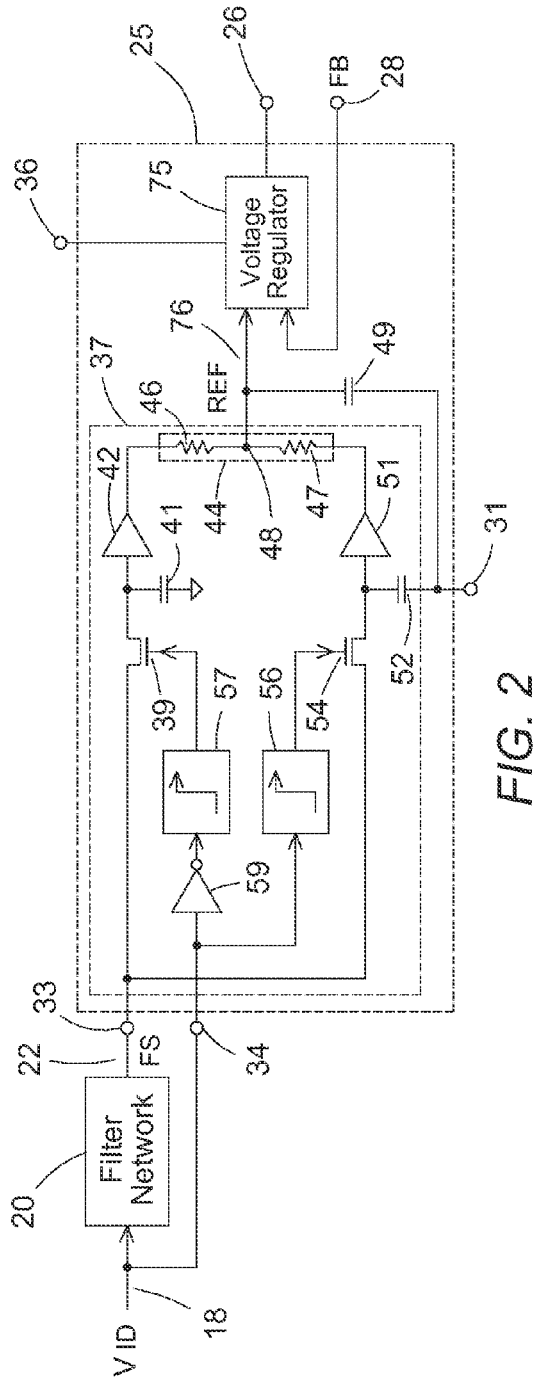
FIG. 2 schematically illustrates an example of an embodiment of a portion of a ripple suppressor circuit that is an alternate embodiment of the ripple suppressor circuit that was described in the description of FIG. 1 in accordance with the present invention.

FIG. 2 schematically illustrates an example of an embodiment of a portion of a power supply controller 25 that is an alternate embodiment of controller 71 was described in the description of FIG. 1. Controller 25 is configured to receive an operating voltage for operating controller 25 between a voltage input 36 and a voltage return 31. Controller 25 typically includes an output 26 that is configured to form control signal 78 and a feedback input 28 that is configured to receive the feedback signal (FB).

Controller 25 also includes a ripple suppressor circuit 37 that is an alternate embodiment of circuit 73 that was described in the description of FIG. 1. Circuit 37 is similar to and operates similarly to circuit 73 except that circuit 37 has a non-limiting example of a more specific implementation. Circuit 37 includes an input 34 that is configured to receive signal 18 and an input 33 that is formed to receive signal 22. Circuit 37 includes a first channel, that is configured to store the peak value of signal 22 responsively to a first change in state of signal 18. Circuit 37 also includes a second channel configured to store the minimum value of signal 22 responsively to a second change in state of signal 18. One channel of circuit 37 includes a switch, illustrated by a transistor 39, a storage capacitor 41, a buffer 42, and a transition detector circuit. In one embodiment, the transition detector circuit includes an inverter 59 and an edge detector 57. Another channel of circuit 37 includes another switch, illustrated as a transistor 54, a storage capacitor 52, a buffer 51, and another transition detector circuit that includes an edge detector 56. Edge detectors 56 and 57 may have a variety of well-known circuit implementations including a one-shot or other timing circuit, or a D-type flip flop, or a series of gates.

In operation, and referring to FIGS. 2 and 3, assume that at a time T0 signal 18 is asserted and the value of signal 22 is increasing in response to the asserted state of signal 18. At a time T1, signal 18 transitions from the asserted state to a negated state. Because signal 18 is no longer asserted, signal 22 has reached the maximum value or peak value during the cycle of signal 18 at the time that signal 18 transitions. Circuit 37 is configured to detect the asserted to negated state transition and store the peak value on capacitor 41. Inverter 59 inverts signal 18 so that the input to edge detector 57 transitions from a negated to asserted state at time T1. Edge detector 57 is configured to generate a short pulse in response to the asserted to negated transition of signal 18. The short pulse enables transistor 39 so that the value of signal 22 is stored on capacitor 41 at the asserted to negated transition of signal 18. Circuit 37 holds the stored peak value of signal 22 from a time after the transition of signal 18, after the termination of the pulse from detector 57, until the next asserted to negated transition of signal 18. Holding the value assists in providing a stable value for the stored peak value. The width of the pulse from detector 57 is very short and is no longer than is necessary to store the value of signal 22 on capacitor 41. In some embodiments, the width of the pulse may be only a couple of nano-seconds.

Signal 18 remains negated from time T1 to a time T2, therefore, the value of signal 22 decreases between times T1 and T2. At time T2, signal 18 transitions from a negated to an asserted state. The value of signal 22 is at the minimum or valley value at the transition. Edge detector 56 detects the negated to asserted transition and forms a short pulse. The short pulse enables transistor 54 so that the valley value of signal 22 may be stored on capacitor 52 at the negated to asserted transition of signal 18. Circuit 37 holds the stored minimum value of signal 22 from a time after the transition of signal 18 until the next negated to asserted transition of signal 18. Holding the value assists in providing a stable value for the stored minimum value. The width of the pulse from detector 56 is very short and is no longer than is necessary to store the value of signal 22 on capacitor 52. In some embodiments, the width of the pulse may be only a couple of nano-seconds.

Circuit 37 includes an averaging circuit 44 that receives the peak value that was stored on capacitor 41 and the minimum or valley value that was stored on capacitor 52 and forms a reference (REF) signal that is an average value of the peak value and the valley value of signal 22. An example embodiment of circuit 44 is illustrated in FIG. 2 as resistors 46 and 47 that have a common connection at a node 48 so that the output of buffer 12 is transmitted to node 48 through resistor 46 and the valley value is transmitted from buffer 51 through resistor 47 to node 48. Resistors 46 and 47 allow averaging the peak and minimum values of signal 22 to form the average value of reference (REF) signal 76. For example, the voltage across resistor 47 is (peak-valley)/2, and the voltage at node 48 is valley+((peak-valley)/2)=(peak+valley)/2). In a typical operation, the duty cycle of signal 18 remains constant for many cycles of signal 18. The duty cycle changes only if it is desired to increase or decrease the value of the output voltage (Vout). The period of signal 18 typically is constant. However, in some other embodiment, the frequency of signal 18 may change and circuit 37 will continue to minimize or suppress the variations of signal 22 and improve the stability of Vout.

A change in duty cycle is illustrated between times T2 and T3. At time T3, signal 18 again transitions from an asserted to negated state. However, the duty cycle of signal 18 has increased for this period of signal 18, therefore the peak value of signal 22 is greater than it was in the previous period (as illustrated by peak values 86 and 88). Circuit 37 determines the new peak value of signal 22 and forms an average value of signal 22 that increases in response to the increased peak value as illustrated by plot 84 at time T3. Thus, the value of REF increases at time T3. In a typical operation, the duty cycle would remain at the increased value for several periods of signal 18 before the duty cycle would again change. However, the duty cycle may also change for only a few periods in some operations. Circuit 37 may also include a reference capacitor 49 that assists in forming the value of signal 76.

In one example embodiment, circuit 37 stores the peak value, responsively to signal 18, thus, the value of signal 22 has reached the peak value and is not changing at the time it is stored. Since circuit 37 stores the minimum value of signal 22 responsively to signal 18, the value of signal 22 has reached the minimum value and is not changing at the time it is stored. Therefore the value of REF is stable. It is believed that the value, of the signal 76 is substantially constant for a constant duty cycle of signal 18. However, the value of signal 22 may vary as much as plus or minus ten percent (10%) for a constant duty cycle of signal 18. Because the value of signal 76 is stable, it facilitates regulator 75 minimizing the ripple voltage on Vout. It also minimizes the ripple without limiting the control loop bandwidth and without deteriorating the dynamic performance of the system that uses circuit 37.

In order to facilitate the hereinbefore described functionality for circuit 37, input 33 is commonly connected to a source (or alternately a drain) of transistor 39 and a source (or alternately a drain) of transistor 54. A drain (or alternately a source) of transistor 39 is connected to a first terminal of capacitor 41 and to an input of buffer 42. An output of buffer 42 is connected to a first terminal of resistor 46 which has a second terminal connected to node 48. Node 48 is connected to an output of circuit 37 to form the REF signal. Node 48 is also connected to a first terminal of resistor 47 which has a second terminal connected to an output of buffer 51. An input of buffer 51 is commonly connected to a first terminal of capacitor 52 and a drain for alternately a source) of transistor 54. A second terminal of capacitor 52 is connected to return 31. A second terminal of capacitor 41 is also connected to return 31. Input 34 is commonly connected to an input, of inverter 59 and an input of detector 56. An output of detector 56 is connected to a gate of transistor 54. An output of inverter 59 is connected to an input of detector 57 which has an output connected to a gate of transistor 39.

Figure 4:
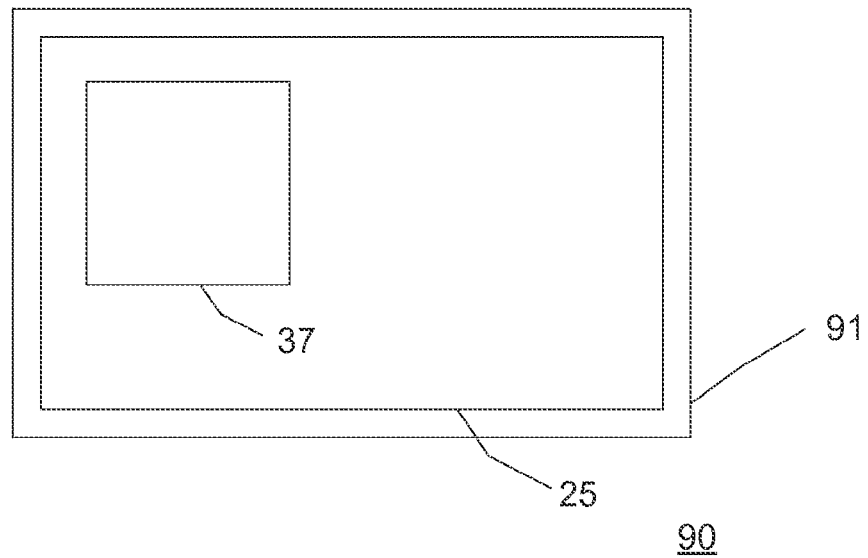
FIG. 4 illustrates an enlarged plan view of a semiconductor device that includes the ripple suppressor circuits of FIGS. 1 and 2 in accordance with the present invention.

FIG. 4 illustrates an enlarged plan view of a portion of an embodiment of a semiconductor device or integrated circuit 90 that is formed on a semiconductor die 91. Either of circuits 73 and/or 37 may be formed on die 91. Die 91 may also include other circuits that are not shown in FIG. 4 for simplicity of the drawing. Circuit 37 and device or integrated circuit 90 are formed on die 91 by semiconductor manufacturing techniques that are well known to those skilled in the art.

From all the foregoing one skilled in the art can determinate that according to one embodiment, a ripple suppressor circuit may comprise:

a first input (for example input 34) configured to receive a first signal (for a non-limiting example—signal 18) that is a pulse width modulated signal having a duty cycle that is representative of a requested output voltage value; a second input (for a non-limiting example-input 33) configured to receive a second signal that is a filtered value of the first signal;

a first storage element; a second storage element;

a first switch configured to store a first value (for a non-limiting example—one of the peak or value values) of the second signal on the first storage element responsively to a first transition of the first signal;

a second switch configured to store a second value (for a non-limiting example—the other of the one of the peak or value values) of the second signal on the second storage element, responsively to a second transition of the first signal; and an averaging circuit configured to receive the first value, of the second signal from the first storage element and to receive the second value of the second signal from the second storage element and form a reference signal having a value that is an average value of the first value and the second value.

In another embodiment, the circuit may include a first edge detector configured to receive the first signal and form a first pulse to enable the first switch responsively to the first transition of the first signal.

An embodiment may include a second edge detector configured to receive the first signal and form a second pulse to enable the second switch responsively to the second transition of the first signal.

In another embodiment, the first switch may be a first transistor having a control electrode coupled to the first edge detector to enable the first transistor responsively to the first pulse, a first current carrying electrode coupled to a first terminal of the first storage element, and a second current carrying electrode coupled to receive the second signal.

Another embodiment may include that the first storage element is a capacitor having a first terminal coupled to the first current carrying electrode of the first transistor and a second terminal coupled to a common return.

An embodiment may include that the second switch is a second transistor having a control electrode coupled to the second edge detector to enable the second transistor responsively to the second pulse, a first current carrying electrode coupled to a first terminal of the second storage element, and a second current carrying electrode coupled to receive the second signal.

Another embodiment may include that the second storage element is a capacitor having a first terminal coupled to the first current carrying electrode of the second transistor and a second terminal coupled to a common return.

In view of all of the above, it is evident that a novel device and method is disclosed. Included, among other features, is configuring the ripple suppressor circuit to determine a peak value and a minimum value of the filtered signal and form a resulting signal that has a substantially constant value. Storing the peak value at the peak and the valley value at the valley facilitates forming the resulting signal to be substantially constant. Holding the peak value and the valley value for the remainder of the cycle also assists in the substantially constant value. Storing the peak value and the valley value responsively to changes of the control signal 18 also assists in the stability of the resulting signal.

While the subject matter of the descriptions are described with specific preferred embodiments and example embodiments, the foregoing drawings and descriptions thereof depict only typical and examples of embodiments of the subject matter and are not therefore to be considered to be limiting of its scope, it is evident that many alternatives and variations will be apparent to those skilled in the art. There are other alternates to the sample and hold circuit that we should mention. In another embodiment, the storage element may also be an analog to digital converter (ADC) circuit. The averaging circuit may have other embodiments, for example averaging circuit 44 may be formed as an analog circuit that includes analog amplifiers having gains that form the average value, or may include an ADC and digital storage elements. Although the subject matter may be described using particular MOS transistors the descriptions are applicable to other MOS transistors and other transistors including, bipolar transistors, as well as BiCMOS, metal semiconductor FETs (MESFETs), HFETs, and other transistor structures.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. A ripple suppressor circuit comprising:
a first input configured to receive a first signal that is a pulse width modulated signal having a duty cycle that is representative of a requested output voltage value;
a second input configured to receive a second signal that is a filtered value of the first signal;
a first storage element;
a second storage element;
a first switch configured to store a first value of the second signal on the first storage element responsively to a first transition of the first signal;
a second switch configured to store a second value of the second signal on she second storage element responsively to a second transition of the first signal; and
an averaging circuit configured to receive the first value of the second signal from the first storage element and to receive the second value of the second signal from the second storage element and form a reference signal having a value that is an average value of the first value and the second value.

2. The ripple suppressor circuit of claim 1 further including a first edge detector configured to receive the first signal and form a first pulse to enable the first switch responsively to the first transition of the first signal.

3. The ripple suppressor circuit of claim 2 further including a second edge detector configured to receive the first signal and form a second pulse to enable the second switch responsively to the second transition of the first signal.

4. The ripple suppressor circuit of claim 2 wherein the first switch is a first transistor having a control electrode coupled to the first edge detector to enable the first transistor responsively to the first pulse, a first current carrying electrode coupled to a first terminal of the first storage element, and a second current carrying electrode coupled to receive the second signal.

5. The ripple suppressor circuit of claim 4 wherein the first storage element is a capacitor having a first terminal coupled to the first current carrying electrode of the first transistor and a second terminal coupled to a common return.

6. The ripple suppressor circuit of claim 4 wherein the second switch is a second transistor having a control electrode coupled to the second edge detector to enable the second transistor responsively to the second pulse, first current carrying electrode coupled to a first terminal of the second storage element, and a second current carrying electrode coupled to receive the second signal.

7. The ripple suppressor circuit of claim 6 wherein the second storage element is a capacitor having a first terminal coupled to the first current carrying electrode of the second transistor and a second terminal coupled to a common return.

8. A method of forming a ripple suppressor circuit of a power supply controller comprising:
forming a first input of the ripple suppressor circuit to receive a first signal that is a pulse width modulated signal having a duty cycle that is representative of a requested output voltage value;
forming a second input of the ripple suppressor circuit to receive a second signal that is a filtered value of the first signal;
forming the ripple suppressor circuit to form a third signal that is a peak value of the second signal;
configuring the ripple suppressor circuit to form a fourth signal that is a valley value of the second signal; and
configuring the ripple suppressor circuit to form an output signal that is an average value of the third and fourth signals.

9. The method of claim 8 further including forming the ripple suppressor circuit as a portion of a switching power supply controller wherein the switching power supply controller controls a value of an output voltage formed by the switching power supply controller to change the output voltage responsively to a change in the output signal of the ripple suppressor circuit.

10. The method of claim 8 wherein forming the ripple suppressor circuit to form the third signal includes configuring the ripple suppressor circuit to store the peak value of the second signal on a first storage element responsively to a first transition of the first signal.

11. The method of claim 10 wherein forming the ripple suppressor circuit to store the peak value includes forming the ripple suppressor circuit to store the peak value at the first transition of the first signal as a stored value and to hold the stored value subsequently to the first transition.

12. The method of claim 10 wherein forming the ripple suppressor circuit to form the fourth signal includes configuring the ripple suppressor circuit to store the valley value of the second signal on a second storage element responsively to a second transition of the first signal wherein the second transition is opposite to the first transition.

13. The method of claim 12 wherein forming the ripple suppressor circuit to store the valley value includes forming the ripple suppressor circuit to store the valley value at the second transition of the second signal as a stored value and to hold the stored value subsequently to the second transition.

14. The method of claim 8 wherein forming the second input of the ripple suppressor circuit to receive the second signal that is a filtered value of the first signal includes configuring the second input of the ripple suppressor circuit to receive the second signal wherein the filtered value varies proportionally to the first signal.

15. The method of claim 8 wherein the second signal is an analog signal.

16. A method of forming a ripple suppressor circuit comprising:
configuring a first input of the ripple suppressor circuit to receive a first signal that is a digital signal having a duty cycle that is representative of a desired value;
configuring a second input of the ripple suppressor circuit to receive a second signal that is an analog signal having a value that varies responsively to changes of the first signal;
configuring the ripple suppressor circuit to determine a peak value of the second signal responsively to a first state change of the first signal and to determine a minimum value of the second signal responsively to a second state change of the first signal; and
configuring the ripple suppressor circuit to form an average value of the peak value and the minimum value.

17. The method of claim 8 wherein configuring the second input of the ripple suppressor circuit to receive the second signal that is a filtered value of the first signal includes configuring the second input to receive the filtered value that varies in response to changes of the first signal.

18. The method of claim 16 wherein configuring the ripple suppressor circuit to determine the peak value of the second signal includes configuring a first channel of the ripple suppressor circuit to store the peak value of the second signal at the first state change of first signal and configuring a second channel of the ripple suppressor circuit to store the minimum value of the second signal at the second state change of first signal.

19. The method of claim 16 wherein configuring the second input of the ripple suppressor circuit to receive the second signal that is the analog signal having the value that varies responsively to changes of the first signal includes configuring the second input to receive the second that varies proportionally to the first signal.

20. The method of claim 16 wherein configuring the ripple suppressor circuit to form the average value of the peak value and the minimum value includes configuring an averaging circuit to form a signal that is substantially one-half of the sum of the peak value and the minimum value.

* * * * *